(12) United States Patent
Kim et al.

(10) Patent No.: US 12,308,475 B2
(45) Date of Patent: May 20, 2025

(54) LEAD TAB FOR SECONDARY BATTERY, MANUFACTURING APPARATUS THEREOF, AND SECONDARY BATTERY COMPRISING SAME

(71) Applicant: LG ELECTRONICS INC., Seoul (KR)

(72) Inventors: Soongil Kim, Seoul (KR); Jongdeok Kim, Seoul (KR); Juchul Lee, Seoul (KR); Hongcheol Lee, Seoul (KR)

(73) Assignees: LG ELECTRONICS INC., Seoul (KR); LG CHEM, LTD., Seoul (KR)

( * ) Notice: Subject to any disclaimer, the term of this patent is extended or adjusted under 35 U.S.C. 154(b) by 1035 days.

(21) Appl. No.: 17/296,185

(22) PCT Filed: Nov. 23, 2018

(86) PCT No.: PCT/KR2018/014513
§ 371 (c)(1),
(2) Date: May 21, 2021

(87) PCT Pub. No.: WO2020/105761
PCT Pub. Date: May 28, 2020

(65) Prior Publication Data
US 2022/0013870 A1 Jan. 13, 2022

(30) Foreign Application Priority Data

Nov. 21, 2018 (KR) .................. 10-2018-0144817

(51) Int. Cl.
*H01M 50/533* (2021.01)
*H01M 50/105* (2021.01)
(Continued)

(52) U.S. Cl.
CPC ....... *H01M 50/533* (2021.01); *H01M 50/105* (2021.01); *H01M 50/178* (2021.01);
(Continued)

(58) Field of Classification Search
CPC ............. H01M 50/533; H01M 50/178; H01M 50/105; H01M 50/534
See application file for complete search history.

(56) References Cited

U.S. PATENT DOCUMENTS

2004/0196133 A1* 10/2004 Kawanishi ............. H01H 85/06
337/159
2016/0064814 A1* 3/2016 Jang ..................... H05K 9/0075
174/377
(Continued)

FOREIGN PATENT DOCUMENTS

JP H07246657 9/1995
JP 2009224218 10/2009
(Continued)

OTHER PUBLICATIONS

PCT International Application No. PCT/KR2018/014513, International Search Report dated Aug. 13, 2019, 4 pages.
(Continued)

*Primary Examiner* — Olatunji A Godo
(74) *Attorney, Agent, or Firm* — LEE, HONG, DEGERMAN, KANG & WAIMEY (57) ABSTRACT

A lead tab for a secondary battery, according to an embodiment of the present invention, includes a metal lead having a long rectangular plate shape in a first direction, a first insulation film formed on a lower surface of the metal lead in a second direction crossing the first direction, and a second insulation film formed on an upper surface of the metal lead in the second direction so as to correspond to the first insulation film, wherein each of the first insulation film and the second insulation film has a magnetic member which is induction-heated by an alternating magnetic field.

10 Claims, 6 Drawing Sheets

(51) Int. Cl.
  *H01M 50/178* (2021.01)
  *H01M 50/534* (2021.01)
  *H01M 50/536* (2021.01)
  *H01M 50/543* (2021.01)
  *H05B 6/10* (2006.01)

(52) U.S. Cl.
  CPC ....... *H01M 50/534* (2021.01); *H01M 50/536* (2021.01); *H01M 50/543* (2021.01); *H05B 6/105* (2013.01)

(56) References Cited

U.S. PATENT DOCUMENTS

2016/0248278 A1* 8/2016 Ebe .................. H01L 23/373
2019/0082503 A1   3/2019 Wi et al.

FOREIGN PATENT DOCUMENTS

| JP | 2011076861 | 4/2011 |
| KR | 100876117 | 12/2008 |
| KR | 1020160116608 | 10/2016 |
| KR | 20170117883 | 10/2017 |
| WO | 2012063764 | 5/2014 |
| WO | 2018066645 | 4/2018 |
| WO | 2018128302 | 7/2018 |

OTHER PUBLICATIONS

European Patent Office Application Serial No. 18940946.9, Search Report dated Jul. 6, 2022, 9 pages.

* cited by examiner

LEAD TAB FOR SECONDARY BATTERY, MANUFACTURING APPARATUS THEREOF, AND SECONDARY BATTERY COMPRISING SAME

CROSS-REFERENCE TO RELATED APPLICATIONS

This application is the National Stage filing under 35 U.S.C. 371 of International Application No. PCT/KR2018/014513, filed on Nov. 23, 2018, which claims the benefit of earlier filing date and right of priority to Korean Application No. 10-2018-0144817 filed on Nov. 21, 2018, the contents of which are all hereby incorporated by reference herein in their entirety.

TECHNICAL FIELD

The present invention relates to a lead tab for a secondary battery, and in particular, a lead tab for a secondary battery capable of shortening a bonding process time between a metal lead and an insulating film and a bonding process between insulating films, a manufacturing apparatus thereof, and a secondary battery including the same.

BACKGROUND ART

With the recent increase in weight reduction and high functionality of small electronic devices and the spread of electric vehicles or energy storage systems (ESS), there is an increasing demand for secondary batteries used in such devices or systems.

A lead tab is used as a connection terminal of an external circuit to drive a device or system using a secondary battery. To this end, the lead tab is connected to the electrode of the secondary battery, and in order to seal and insulate the secondary battery to the outside of the case, an insulating film made of a synthetic resin such as PP (polypropylene) may be bonded to both sides of the metal lead.

In particular, according to the recent expansion of the spread of electric vehicles or energy storage systems, a larger size of the secondary battery is required, and accordingly, the standard of the lead tab may also increase. As the standard of the lead tab increases, the time and difficulty of the process of bonding the insulating film to the metal lead may increase.

As a related art, Patent Document 1 (Registered Patent Publication No. 10-1508545, registered on Mar. 30, 2015) discloses a content of attaching a resistance heater to the upper and lower portions of a lead tab, and continuously bonding a metal lead and an insulating film as a heat source conducted from the heater. However, according to Patent Document 1, when heat generated from the resistance heater is transferred to the metal lead and the insulating film, it may take excessive time for heat to be transferred to the metal lead and the insulating film due to the low thermal conductivity of the insulating film. This may lead to an increase in process time when manufacturing a lead tab. In addition, when the temperature of the resistance heater is increased in order to shorten the process time, the insulating film may be deformed, resulting in a problem of lowering adhesion.

On the other hand, Patent Document 2 (Japanese Patent No. 4580499, registered on Sep. 3, 2010) discloses the content of bonding the metal lead and the insulating film by generating heat by high-frequency induction heating the surface of the metal lead. However, according to Patent Document 2, since bonding between insulating films is impossible, an additional process for bonding between insulating films must be performed.

DISCLOSURE

Technical Problem

The problem to be solved by the present invention is to provide a lead tab for a secondary battery and a manufacturing apparatus thereof that can shorten the process time of the bonding process in which bonding between the metal lead and the insulation film, and bonding between the insulation films is performed. will be.

Technical Solution

A lead tab for a secondary battery according to an embodiment of the present invention includes a metal lead having a rectangular plate shape long in a first direction, and a first insulation film formed in a second direction crossing the first direction from a lower surface of the metal lead, and a second insulation film formed in the second direction so as to correspond to the first insulation film on an upper surface of the metal lead, and each of the first insulation film and the second insulation film includes a magnetic member that is induction-heated by an alternating magnetic field.

A partial region including a center of the first insulation film can be bonded to the lower surface of the metal lead, and a partial region including a center of the second insulation film can be bonded to the upper surface of the metal lead, and the remained region of the insulation film and the remained region of the second insulation film may be bonded to each other.

The metal lead, the first insulation film, and the second insulation film may be bonded to each other by thermal fusion.

According to an embodiment, the magnetic member may be formed on a bonding surface bonded to the metal lead and the second insulation film among both surfaces of the first insulation film, and may be formed on a bonding surface bonded to the metal lead and the first insulation film among both surfaces of the second insulation film respectively.

According to an embodiment, the magnetic member may be added to the first insulation film and the second insulation film in a powder form.

The magnetic member may include a metal-based, a ceramic-based, or an oxide-based magnetic material.

An apparatus for manufacturing a lead tab for a secondary battery according to an embodiment of the present invention includes a first induction heating head and a second induction heating head for pressing and bonding a first insulation film, a metal lead, and a second insulation film and each of the first induction heating head and the second induction heating head includes an induction coil that emits an AC magnetic field by supply of AC power.

The first induction heating head and the second induction heating head may be driven to pressurize the first insulation film, the metal lead, and the second insulation film positioned between the first induction heating head and the second induction heating head according to the supply of the AC power, and the induction coil may emit the alternating magnetic field according to a supply of the AC power for bonding of a partial region of the first insulation film and the metal lead, bonding of a partial region of the second insulation film and the metal lead, and bonding of the remained region of the first insulation film and the remained region of the second insulation film.

The induction coil may be implemented as a winding induction coil or a copper tube induction coil.

The first induction heating head may include a first induction heating body in which the induction coil is accommodated and a first elastic pad provided on a surface of the first induction heating body facing the second induction heating head. And the second induction heating head may include a second induction heating body in which the induction coil is accommodated and a second elastic pad provided on a surface of the second induction heating body facing the first induction heating head.

Each of the first elastic pad and the second elastic pad may include a releasing agent formed on a surface in contact with the metal lead, the first insulation film, or the second insulation film.

The heat resistance temperature of each of the first elastic pad and the second elastic pad may be higher than a melting temperature of a film member of the first insulation film and the second insulation film.

According to an embodiment, an apparatus for manufacturing a lead tab for a secondary battery further includes a first heating head and a second heating head temporarily bonding the first insulation film, the metal lead, and the second insulation film, and the first induction heating head, the second induction heating head may press and bond the first insulation film, the metal lead, and the second insulation film that are temporarily bonded to each other.

Advantageous Effects

According to an embodiment of the present invention, a magnetic member that is inductively heated by an alternating magnetic field may be provided in the insulation film of the lead tab for a secondary battery. Accordingly, bonding between the metal lead and the insulation film and bonding between the insulation films may be simultaneously performed using an induction heating method during the bonding process. Therefore, compared to the sequentially bonding between the metal lead and the insulation film and bonding between the insulation films, the bonding process time can be effectively reduced. In addition, by reducing the bonding process time, productivity of the lead tab for the secondary battery may be improved.

In addition, since bonding between the metal lead and the insulation film and bonding between the insulation films can be simultaneously performed in one pair of induction heating heads, the number of heads required for the bonding process and the space occupied by the heads can be minimized. Accordingly, a producer can more efficiently and economically construct a production environment for a lead tab for the secondary battery.

BEST MODE FOR INVENTION

Hereinafter, embodiments disclosed in the present specification will be described in detail with reference to the accompanying drawings, but the same or similar elements are assigned the same reference numerals regardless of the reference numerals, and redundant descriptions thereof will be omitted. The suffixes "module" and "unit" for the elements used in the following description are given or used interchangeably in consideration of only the ease of writing the specification, and do not have meanings or roles that are distinguished from each other by themselves. In addition, in describing the embodiments disclosed in the present specification, when it is determined that a detailed description of related known technologies may obscure the subject matter of the embodiments disclosed in the present specification, the detailed description thereof will be omitted. In addition, it should be noted that the accompanying drawings are for easy understanding of the embodiments disclosed in the present specification and should not be construed as limiting the technical spirit disclosed in the present specification by the accompanying drawings.

Also, when an element such as a layer, region or substrate is referred to as being "on" another component, it may be directly on another element or there may be an intermediate element between them.

The display device described herein may include a mobile phone, a smart phone, a laptop computer, a digital broadcasting terminal, a personal digital assistant (PDA), a portable multimedia player (PMP), a navigation system, and a slate PC, a Tablet PC, a Ultra Book, a digital TV, a desktop computer, etc. However, it will be readily apparent to those skilled in the art that the configuration according to the embodiment described in the present specification may be applied to a device capable of displaying even if it is a new product type to be developed later.

Figure 1:
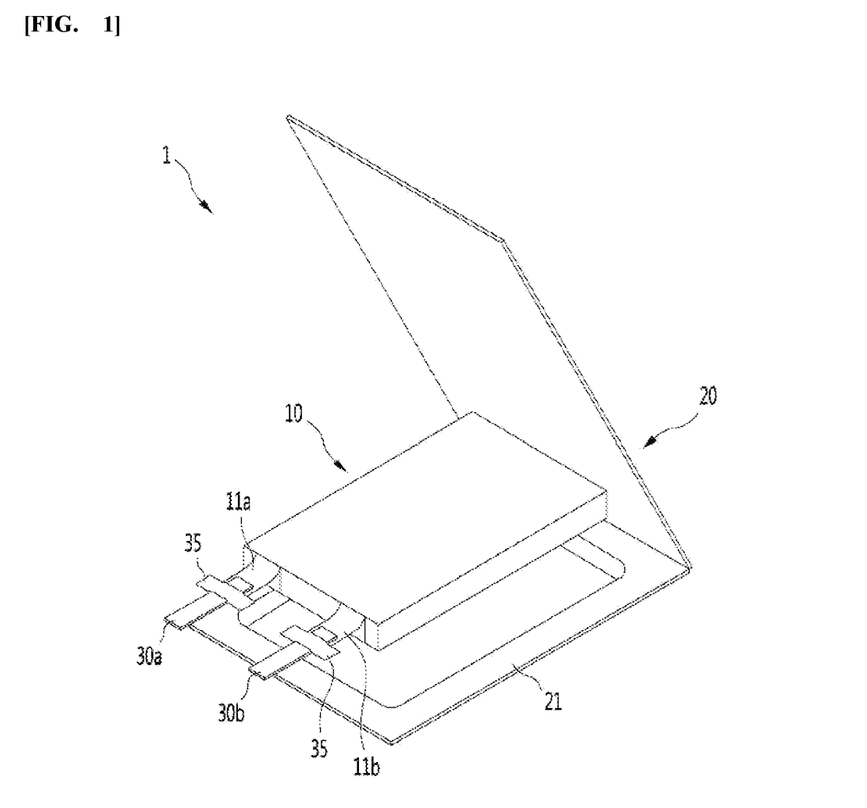
FIG. 1 is a schematic drawing showing a secondary battery including a lead tab according to an embodiment of the present invention.

FIG. 1 is a schematic drawing showing a secondary battery including a lead tab according to an embodiment of the present invention. And FIG. 2 is a drawing showing a lead tab according to an embodiment of the present invention.

Figure 2:
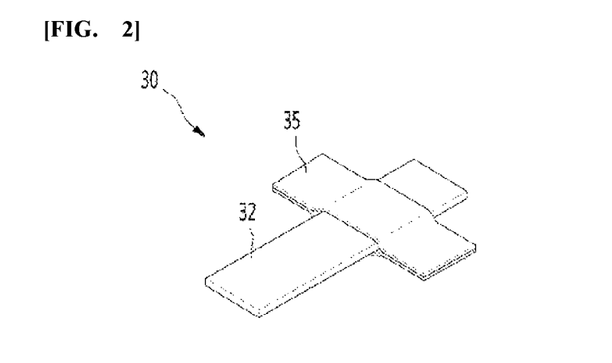
FIG. 2 is a drawing showing a lead tab according to an embodiment of the present invention.

Referring to FIGS. 1 and 2, the secondary battery 1 may include a battery unit 10 and a pouch 20 having an accommodation space in which the battery unit 10 is accommodated.

Each of the electrode plates of the battery unit 10 may be electrically connected to one end of a positive terminal 11*a* and a negative terminal 11*b*, which are electrode terminals, to be drawn out.

A lead tab 30 may be connected to each of the positive terminal 11*a* and the negative terminal 11*b*. For example, the metal lead 32 of the positive lead tab 30*a* may be connected to the positive terminal 11*a*, and the metal lead 32 of the negative lead tab 30*b* may be connected to the negative terminal 11*b*. The lead tab 30 may be connected to the electrode terminals 11*a* and 11*b* by welding or the like, but is not limited thereto.

The metal lead 32 of the lead tab 30 has one end connected to the electrode terminals 11*a* and 11*b*, and the other end exposed to the outside of the sealing portion 21 formed at the edge of the pouch 20. The metal lead 32 may have a rectangular plate shape that is elongated in one direction.

The metal lead 32 connected to the positive terminal 11a may be made of aluminum, and the metal lead 32 connected to the negative terminal 11b may be made of copper, but is not limited thereto.

In addition, the lead tab 30 may be provided with an insulation film 35 bonded to both sides of the metal lead 32. The insulation film 35 may be elongated in a direction orthogonal to one direction of the metal lead 32.

The insulation film 35 has an insulating function while preventing the electrolyte filled in the pouch 20 from leaking to the outside.

The metal lead 32 and the insulation film 35 may be bonded to each other by being fused by heat.

In connection with the bonding of the metal lead 32 and the insulation film 35, in the related art, a technique for bonding the metal lead 32 and the insulation film 35 using a resistance heater has been proposed. Since the bonding time is excessively consumed, the overall process time is increased, and thus productivity may be lowered. In addition, when the temperature of the resistance heater is increased to shorten the bonding time, a problem of lowering adhesion due to deformation of the insulation film 35 may occur.

In addition, a technique for bonding the metal lead 32 and the insulation film 35 by induction heating (eg, high-frequency induction heating) on the surface of the metal lead 32 has been proposed, but since an additional process for bonding is required for bonding insulation films 35, there may also be a problem of lowering productivity due to an increase in the overall process time.

According to an embodiment of the present invention, since bonding between the metal lead 32 and the insulation film 35 and bonding between the insulation films 35 through induction heating can be performed simultaneously in a single process, it makes it possible to increase productivity according to the shortening of the process time.

Hereinafter, a lead tab according to an embodiment of the present invention and a manufacturing process thereof will be described in more detail with reference to FIGS. 3 to 9.

Figure 3:
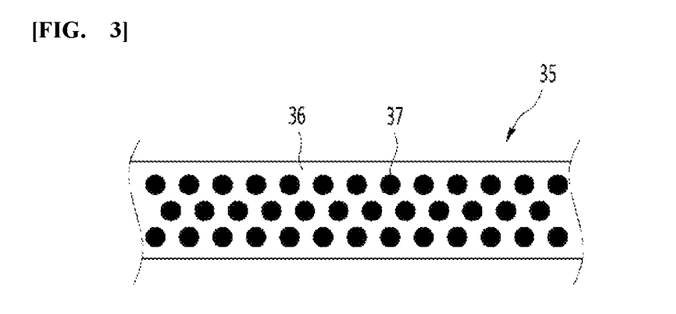
FIG. 3 is a drawing showing one side of an insulation film provided during manufacture of the lead tab shown in FIG. 2.

FIG. 3 is a drawing showing one side of an insulation film provided during manufacture of the lead tab shown in FIG. 2.

Referring to FIG. 3, the insulation film 35 may include a film member 36 and a magnetic member 37. For example, the insulation film 35 may have a thickness of about 100 to 150 micrometers and a width of 9 to 17 millimeters, but this may vary according to the standard of the lead tab 30.

The film member 36 may be implemented with a polymer synthetic resin such as polypropylene, polyethylene, a mixture thereof, or polyurethane. The film member 36 may be softened at about 50° C. to 90° C., and may be melted at about 100° C. to 170° C.

Depending on the embodiment, additives such as liquid paraffin-based, fatty acid ester-based, polyester-based, and polyglycerin-based may be added to the film member 36.

The magnetic member 37 may be formed in a powder form added or applied in the film member 36, but is not limited thereto. For example, the magnetic member 37 may be formed on one of both surfaces of the insulation film 35, but may be formed on both surfaces according to embodiments. When the magnetic member 37 is formed on the one surface, the one surface may correspond to a surface bonded to the metal lead 32 and another insulation film.

The magnetic member 37 may be implemented with an inorganic material that can be heated by an alternating magnetic field generated during induction heating. For example, the material can be implemented as such a metallic magnetic material such as iron (Fe), cobalt (Co), nickel (Ni), manganese bismuth (MnBi), samarium cobalt (SmCo5) or a ceramic-based magnetic material or an oxide-based magnetic material (ferrite), etc.

According to an embodiment, the magnetic member 37 may be contained in the insulation film 35 in about 0.01 to 50 mass percent (wt %). Preferably, the magnetic member 37 may be contained in the insulation film 35 in about 1 to 40 mass percent or about 5 to 30 mass percent.

According to an embodiment, in order to uniformly distribute the magnetic member 37 in the insulation film 35, an organic material such as a silane-based coupling agent may be treated on the surface of the magnetic member 37.

The magnetic member 37 generates heat by the alternating magnetic field, and the film member 36 is melted by the heat generation of the magnetic member 37, thereby being bonded to the metal lead 32 and the other insulation film 35.

That is, as the magnetic member 37 is provided in the insulation film 35, the metal lead 32 and the insulation film 35 can be bonded by induction heating, and the insulation films 35 can be bonded to each other. That is, when the lead tab 30 is manufactured, since the bonding process can perform only one induction heating, the process time can be effectively shortened and productivity can be improved.

Hereinafter, a manufacturing process of the lead tab 30 according to an embodiment of the present invention will be described with reference to FIGS. 4 to 8.

Figure 4:
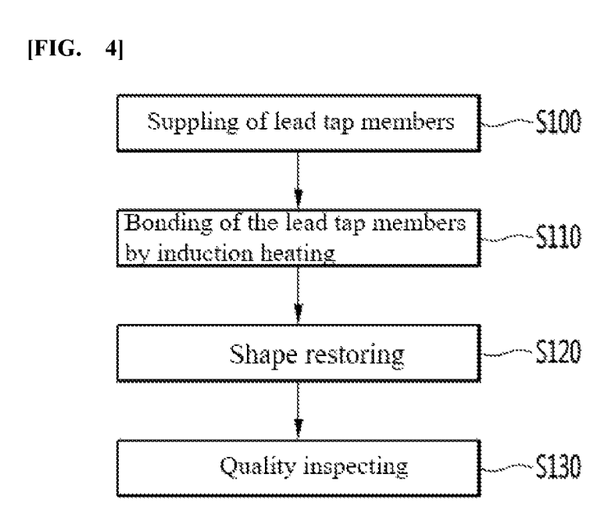
FIG. 4 is a flowchart schematically illustrating a manufacturing process of a lead tab according to an embodiment of the present invention.

FIG. 4 is a flowchart schematically illustrating a manufacturing process of a lead tab according to an embodiment of the present invention. And FIGS. 5 to 8 are drawings for explaining a bonding process of a lead tab member during the manufacturing process of the lead tab shown in FIG. 4. And FIG. 9 is a cross-sectional view of a lead tab according to an embodiment of the present invention.

Referring to FIG. 4, the members (metal lead, insulation film) constituting the lead tab 30 are supplied to the manufacturing apparatus (S100), and a process of bonding the member using induction heating (eg, high frequency induction heating) may be performed (S110).

To this end, the manufacturing apparatus may be provided with an induction coil for induction heating the metal lead 32 and the magnetic member 37 by generating an alternating magnetic field.

Depending on the embodiment, before the bonding process (S110) is performed, a temporary bonding process of temporarily fusion may be further performed. Positioning and alignment of the metal lead 32 and the insulation films 35 may be performed by the temporary bonding process. Since positioning is performed by the temporary bonding process, it is possible to minimize the possibility of bubbles occurring between the insulation film 35 and the metal lead 32 or the insulation films 35 in the bonding process through induction heating.

Hereinafter, with reference to FIGS. 5 to 8, the bonding process (S110) will be described in more detail.

Figure 5:
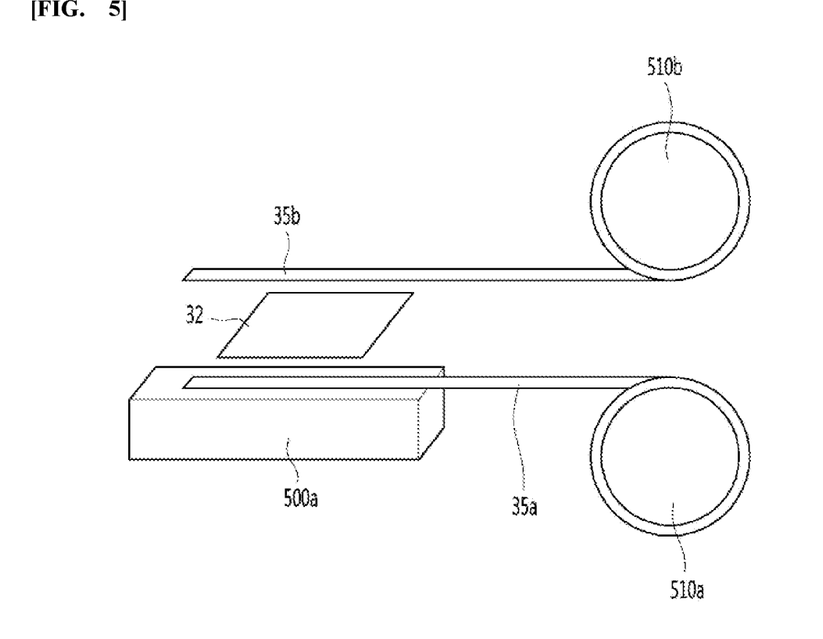
FIGS. 5 to 8 are drawings for explaining a bonding process of a lead tab member during the manufacturing process of the lead tab shown in FIG. 4.
Figure 6:
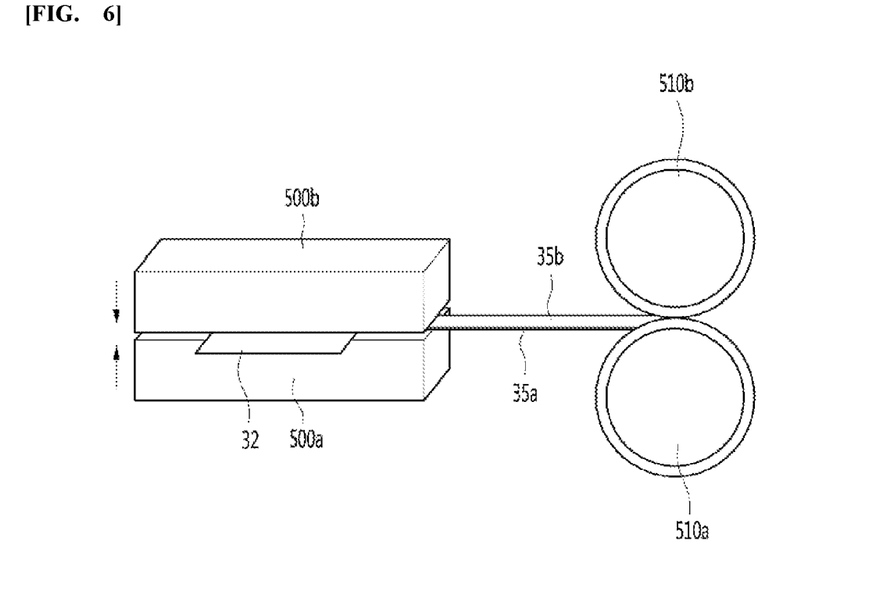

FIGS. 5 to 6 are drawings relating to a temporary bonding process. Depending on the embodiment, the lead tab manufacturing process may not include the temporary bonding process, and in this case, the processes of FIGS. 5 to 6 may be omitted.

Referring to FIGS. 5 and 6, the manufacturing apparatus may include a first heating head 500a and a second heating head 500b. The first heating head 500a and the second heating head 500*b* are components for a temporary bonding process of the metal lead 32, the first insulation film 35*a*, and the second insulation film 35*b*, for example, may include a resistance heater.

A first film suppling unit 510*a* may supply a first insulation film 35*a* to a lower side of the metal lead 32, and a second film suppling unit 510*b* may supply a second insulation film 35*b* to an upper side of the metal lead 32. The first film suppling unit 510*a* and the second film suppling unit 510*b* may be configured in the form of a reel in which the first insulation film 35*a* and the second insulation film 35*b* are wound, respectively. The first insulation film 35*a* and the second insulation film 35*b* may be the same as the insulation film 35 described above in FIG. 3.

For the temporary bonding process, the first film suppling unit 510*a* may supply the first insulation film 35*a* to a top of the first heating head 500*a*. The first insulation film 35*a* supplied to the first heating head 500*a* may be mounted on an upper surface of the first heating head 500*a*.

After the first insulation film 35*a* is supplied, the metal lead 32 may be seated on the first insulation film 35*a*. After the metal lead 32 is seated, the second film suppling unit 510*b* may supply the second insulation film 35*b* onto the metal lead 32 and the first insulation film 35*a*.

After the metal lead 32 and the insulation films 35*a* and 35*b* are put on the first heating head 500*a*, the first heating head 500*a* can be driven upward, and the second heating head 500*b* can be driven downwards. As the heating heads 500*a* and 500*b* are driven, the metal lead 32 and the insulation films 35*a* and 35*b* positioned between the first heating head 500*a* and the second heating head 500*b* may be pressed.

In addition, heat may be generated from a resistance heater provided in each of the first heating head 500*a* and the second heating head 500*b*. Heat generated from the resistance heater is conducted to the metal lead 32 and the insulation films 35*a* and 35*b* by thermal conduction, so that the metal lead 32 and the insulation films 35*a* and 35*b* may be heated.

The metal lead 32 and the insulation films 35*a* and 35*b* may be temporarily bonded (fused) by heating and pressing of the first heating head 500*a* and the second heating head 500*b*. As described above, since the bonding time is long in the case of bonding by thermal conduction, the temporary bonding process may be performed for a set time shorter than the time when the metal lead 32 and the insulation films 35*a* and 35*b* are completely bonded. Temporarily bonded metal leads 32 and insulation films 35*a* and 35*b* may be transferred to induction heating heads 700*a* and 700*b* (see FIG. 7).

Figure 7:
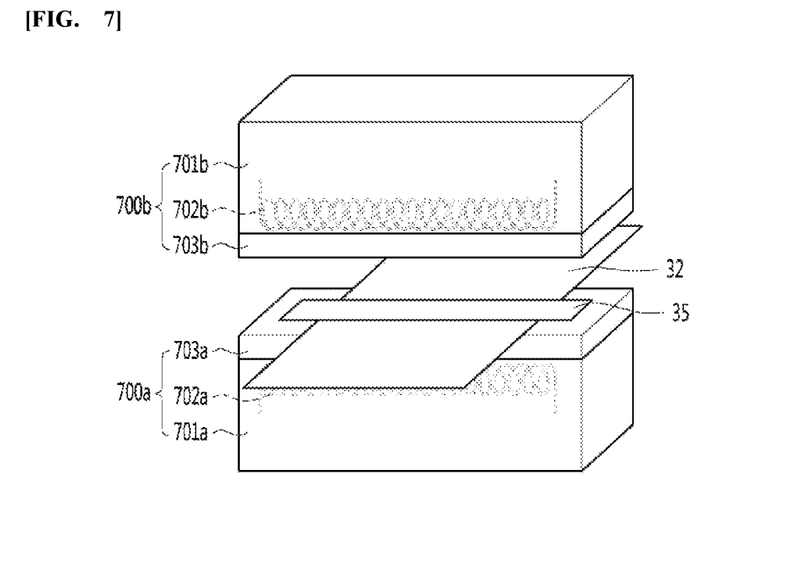

Referring to FIG. 7, the manufacturing apparatus may include a first induction heating head 700*a* and a second induction heating head 700*b*.

The first induction heating head 700*a* may include a first head body 701*a*, a first induction coil 702*a* provided inside the first head body 701*a*, and a first elastic pad 703*a* provided on a surface of the first head body 701*a* facing the second induction heating head 700*b*.

The second induction heating head 700*b* may include a second head body 701*b*, a second induction coil 702*b* provided inside the second head body 701*b*, and a second elastic pad 703*b* provided on a surface of the second head body 701*b* facing the first induction heating head 700*a*.

The first induction coil 702*a* and the second induction coil 702*b* may emit an AC magnetic field as AC power is supplied.

In order for the magnetic member 37 of the metal lead 32 and the insulation film 35 to generate heat according to the emission of the AC magnetic field, the frequency and size of the AC power supplied to the induction coils 702*a* and 702*b* must be greater than or equal to a predetermined value. Based on this, for example, the frequency may be set to 10 kHz to 30 MHz. Preferably, the frequency may be set to 100 kHz to 10 MHz, or 100 kHz to 2 MHz. In addition, the size of the AC power may correspond to about 100 W to 50 kW, preferably 1 kW to 20 kW or 1 kW to 10 kW.

The first induction coil 702*a* and the second induction coil 702*b* may be implemented as a wire-shaped winding induction coil or a copper tube-shaped induction coil. When the induction coils 702*a* and 702*b* are implemented as wound induction coils, the frequency may be set to about 10 kHz to 200 kHz in order to minimize the effect of heat generation of the induction coil.

According to an embodiment, the first induction coil 702*a* and the second induction coil 702*b* may be connected to each other by a Litz wire or the like to be electrically energized. Accordingly, the first induction coil 702*a* and the second induction coil 702*b* may receive current at the same time. However, depending on the embodiment, the first induction coil 702*a* and the second induction coil 702*b* may be independently supplied/stopped with current.

In addition, according to an embodiment, the induction coil may be provided only in any one of the first induction heating head 700*a* and the second induction heating head 700*b*.

The first elastic pad 703*a* and the second elastic pad 703*b* are positioned to prevent direct contact between the head body 701*a*, 701*b* and the lead tab 30, or to prevent direct contact between the induction coils 702*a* and 702*b* and the lead tab 30, so any damage of the induction coil 702*a*, 702*b* or the lead tab 30 can be prevented.

The first elastic pad 703*a* and the second elastic pad 703*b* are in contact with the metal lead 32 and the insulation films 35*a*, 35*b* by vertical driving of the induction heating heads 700*a*, 700*b*, and the metal lead 32 and the insulation films 35*a* and 35*b* may be pressed for a predetermined time. For example, the pressure during the pressurization may be about 0.1 MPa to 1.5 MPa, but is not limited thereto.

The first elastic pad 703*a* and the second elastic pad 703*b* are implemented with a polymer-based material having elasticity to prevent damage to the metal lead 32 and the insulation films 35*a*, 35*b* when pressed. For example, the polymer may include silicone, fluorine, urethane, or synthetic rubber such as nitrile, chloroprene, or butyl.

As an example, the elastic pads 703*a*, 703*b* may have a thickness of about 0.1 mm to 5 mm, preferably 1 mm to 3 mm.

According to an embodiment, for smooth separation of the elastic pads 703*a* and 703*b* and the lead tab 30 after pressing, a releasing agent can be applied to a surface of the first elastic pad 703*a* and the second elastic pad 703*b* in contact with the metal lead 32 or the insulating films 35*a*, 35*b*. For example, the release agent may include a silicone or fluorine-based material.

Figure 8:
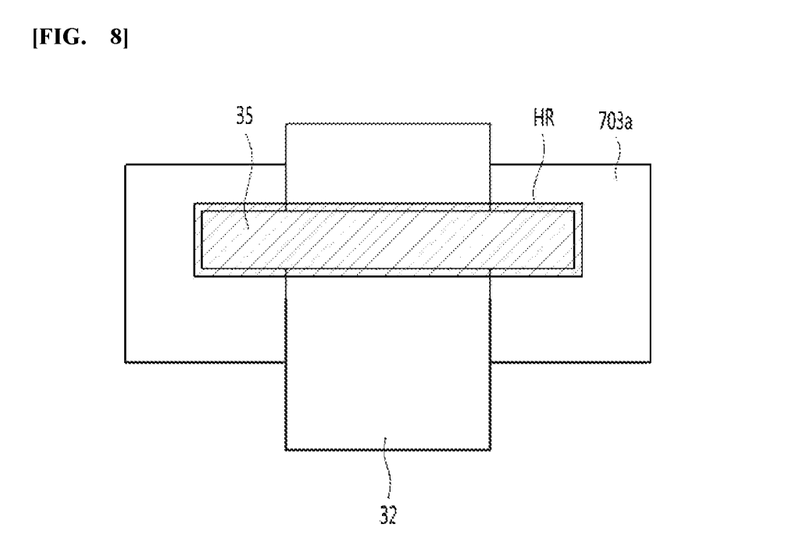
Figure 9:
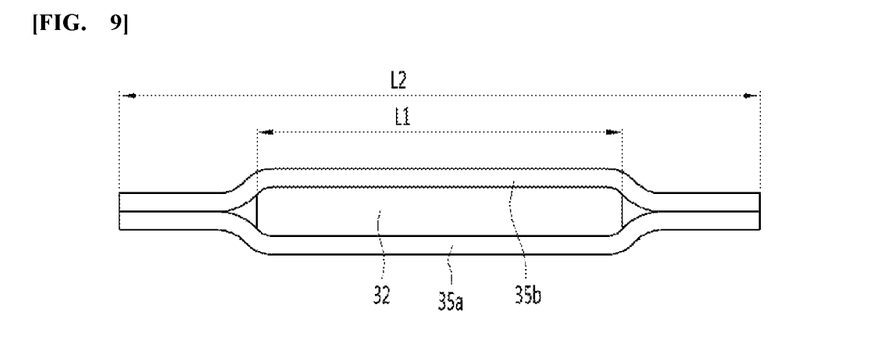
FIG. 9 is a cross-sectional drawing of a lead tab according to an embodiment of the present invention.

Referring to FIG. 8, by driving the first induction heating head 700*a* and the second induction heating head 700*b*, the first elastic pad 703*a* and the second elastic pad 703*b* can press the metal lead 32 and the insulation film 35 (35*a* and 35*b*). In addition, the first induction coil 702*a* and the second induction coil 702*b* may emit an AC magnetic field as AC power is supplied.

By the alternating magnetic field emitted from the induction coils 702*a* and 702*b*, the metal lead 32 disposed in the heating region HR, and the magnetic member 37 of the insulation films 35 can be induction-heated. For example, the metal lead 32 and the insulation films 35 disposed in the heating region HR may be heated to about 100° C. to 300° C., but this is not necessarily the case.

As the metal lead 32 and the insulation film 35 are heated, the film member 36 may be melted and bonded to the metal lead 32, or may be bonded to a corresponding insulation film.

At this time, the elastic pads 703a, 703b may have a heat resistance temperature of −70° C. to 400° C., preferably 25° C. to 300° C. That is, since the elastic pads 703a and 703b have a heat resistance temperature higher than the melting temperature of the film member 36, they may not be deformed or melted when the metal lead 32 and the insulation films 35 are heated.

On the other hand, in order for the heating region HR to be formed to correspond to the insulation films 35, the first induction coil 702a and the second induction coil 702b may be disposed above or below the insulation films 35, but is not necessarily thereto.

In addition, a distance through which the alternating magnetic field emitted from the induction coils 702a and 702b is transmitted may be related to the frequency of the alternating current supplied to the induction coils 702a and 702b. That is, during the manufacturing process of the lead tab 30, by adjusting the frequency of the AC current supplied to the induction coils 702a and 70b to control the distance through which the AC magnetic field is transmitted, the size of the heating region HR can be adjusted to correspond to the insulation film 35.

Referring to FIG. 9, as the bonding process (S110) is performed, a portion of the first insulation film 35a may be bonded to a bottom of the metal lead 32, a portion of the second insulation film 35b may be bonded to an upper surface of the metal lead 32. In addition, the remaining portion of the first insulation film 35a may be bonded to each other with the remaining portion of the second insulation film 35b.

That is, a length L2 of the insulating films 35a and 35b may be formed longer than a width L1 of the metal lead 32 in the lead tab 30. Accordingly, the insulating films 35a and 35b can prevent a gap between the pouch 20 or the sealing part 21 and the metal lead 32 from occurring, and as a result, and can prevent the electrolyte from leaking to the outside.

FIG. 4 will be described again.

After the bonding process (S110) of the metal lead 32 and the insulation films (35a, 35b) is performed, the lead tab 30 can be finally manufactured with through the shape restoration process (S120) and quality inspection (S130).

The shape restoration process (S120) can be a process for mitigating a physical deformation of the lead tab 30 caused by external force or heat during the bonding process (S110), and in particular, can correspond to the process of restoring the shape of both ends of the insulation film 35.

The lead tab 30 on which the shape restoration process (S120) has been completed may be confirmed whether or not it is normally manufactured through a quality inspection (S130).

According to an embodiment, when a defect of the lead tab 30 is detected, the cured film member 36 may be melted again through induction heating to perform the bonding process S110 again. That is, since the magnetic member 37 is formed on the insulation film 35, bonding to the lead tab 30 in which bonding failure has occurred can be easily performed again.

The above description is merely illustrative of the technical idea of the present invention, and those of ordinary skill in the technical field to which the present invention pertains can make various modifications and variations without departing from the essential characteristics of the present invention will be.

Accordingly, the embodiments disclosed in the present invention are not intended to limit the technical idea of the present invention, but to explain the technical idea, and the scope of the technical idea of the present invention is not limited by these embodiments.

The scope of protection of the present invention should be interpreted by the following claims, and all technical ideas within the scope equivalent thereto should be construed as being included in the scope of the present invention.

The invention claimed is:

1. A lead tab for a secondary battery, the lead tab comprising: a metal lead having an elongated rectangular plate shape such that a long side of the elongated rectangular plate shape extends in a first direction; a first insulation film formed at a lower side of the metal lead in a second direction perpendicular to the first direction; and a second insulation film formed at an upper side of the metal lead in the second direction, wherein each of the first insulation film and the second insulation film comprises a magnetic member induction-heated by an alternating magnetic field, wherein the metal lead comprises a center portion, and a first end portion and a second end portion arranged at respective ends of the center portion, wherein the first insulation film and the second insulation film are in contact with both the first end portion and the second end portion of the metal lead, wherein the first insulation film and the second insulation film are in contact with a lower surface and an upper surface of the center portion of the meatal lead, respectively, wherein the first insulation film and the second insulation film are in contact with a lower surface and an upper surface of the first end portion of the metal lead, respectively, and wherein the first insulation film and the second insulation film are in contact with a lower surface and an upper surface of the second end portion of the metal lead, respectively.

2. The lead tab for the secondary battery according to claim 1, wherein a region of the first insulation film including a center of the first insulation film is bonded to the lower side of the metal lead, and a region of the second insulation film including a center of the second insulation film is bonded to the upper side of the metal lead, wherein a remaining region of the first insulation film and a remaining region of the second insulation film are bonded to each other.

3. The lead tab for the secondary battery according to claim 2, wherein the metal lead, the first insulation film, and the second insulation film are bonded to each other by thermal fusion.

4. The lead tab for the secondary battery according to claim 2, wherein the magnetic member comprises a first magnetic member formed both on a bonding surface of the first insulation film bonded to the metal lead and on a bonding surface of the first insulation film bonded to the second insulation film and a second magnetic member formed both on a bonding surface of the second insulation film bonded to the metal lead and on a bonding surface of the second insulation film bonded to the first insulation film.

5. The lead tab for the secondary battery according to claim 1, wherein the magnetic member is added to the first insulation film and the second insulation film in a powder form.

6. The lead tab for the secondary battery according to claim 1, wherein the magnetic member comprises a metal-based, a ceramic-based, or a oxide-based magnetic material.

7. The lead tab for the secondary battery according to claim 1, wherein each of the insulation films comprises a film member and the magnetic member disposed in the film member.

8. The lead tab for the secondary battery according to claim 7, wherein each of the insulation films is melted and bonded to both of the metal lead and the other insulation film with a heat generation of the magnetic member by the alternating magnetic field.

9. The lead tab for the secondary battery according to claim 7, wherein the magnetic member comprises one of a metallic magnetic material, a ceramic-based magnetic material, or an oxide-based magnetic material.

10. The lead tab for the secondary battery according to claim 7, wherein the magnetic member is contained in the first and second insulation film in 0.01 to 50 mass percent.

* * * * *